(No Model.)
J. S. BAYLEY.
CAR COUPLING.
No. 278,764. Patented June 5, 1883.
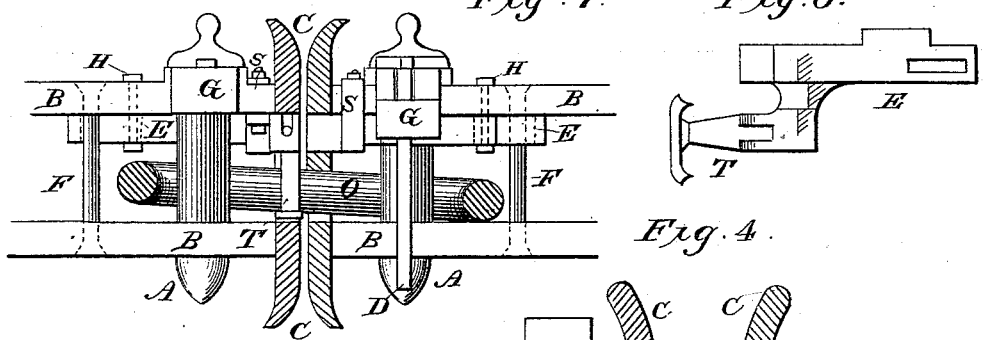
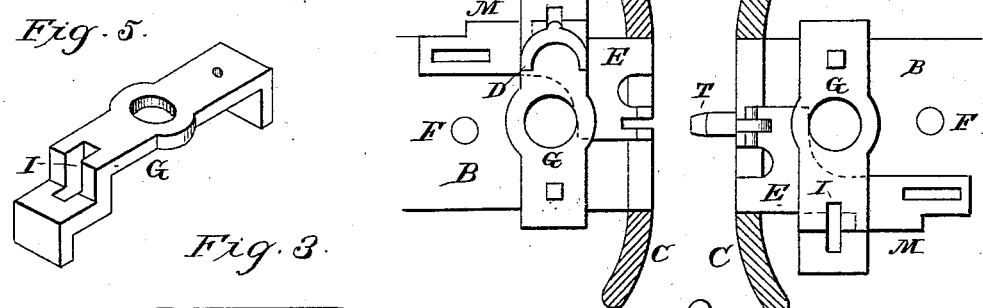
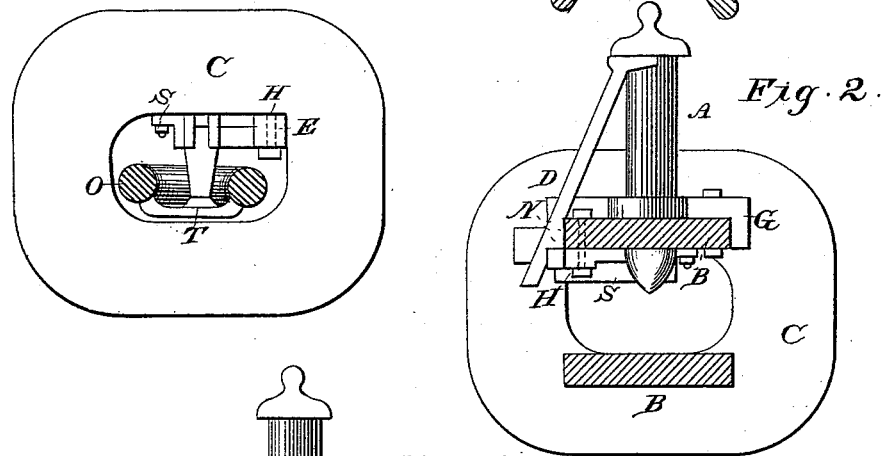
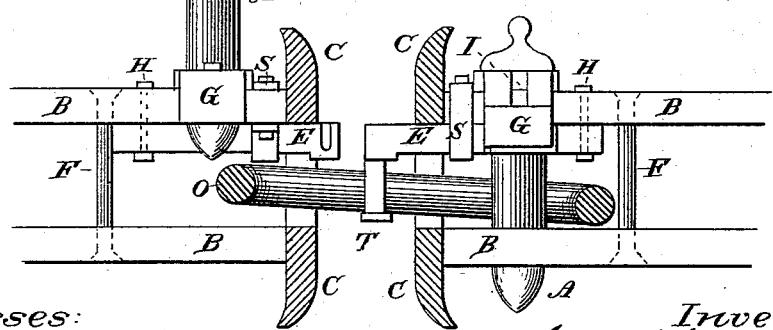
Witnesses:
J. A. Dempwolf
Reinhardt Dempwolf
Inventor:
James Shrigley Bayley

UNITED STATES PATENT OFFICE.

JAMES S. BAYLEY, OF YORK, PENNSYLVANIA.

CAR-COUPLING.

SPECIFICATION forming part of Letters Patent No. 278,764, dated June 5, 1883.

Application filed February 13, 1883. (No model.)

*To all whom it may concern:*

Be it known that I, JAMES SHRIGLEY BAYLEY, a citizen of the United States, residing at York, in the county of York and State of Pennsylvania, have invented a new and useful Improvement in Car-Couplings, of which the following is a specification.

My invention relates to an improvement in car-couplings, of which the important parts consist of two sliding bolts, a hook, a saddle, and a pin-holder.

The object of my improvement is the provision of a proper adjustment of the link and coupling-pin, so as to avoid a man standing between bumpers when in the act of coupling cars. I attain this by the mechanism illustrated by the accompanying drawings, in which—

Figure 1 is a section showing side view of bull-noses detached from car, with side view of bolts, hook, and link and pin in position when coming together; Fig. 2, a section showing end view of bull-nose, looking from side adjoining car, with end view of sliding bolt supporting pin-holder, and side view of saddle, with side view of pin-holder and head of small bolt; Fig. 3, a section showing front of bull-nose, with end view of sliding bolt with hook attached in position supporting coupling-link; Fig. 4, a section showing top view of sliding bolts, and top view of saddle and pin-holder after having dropped; Fig. 5, a detailed view, showing shape of saddle and openings through which pin and pin-holder work; Fig. 6, a detailed view of sliding bolt with hook attached, showing under side; Fig. 7, a section showing side reversed from Fig. 1 after bolts have slid back, pin dropped, and car coupled.

Similar letters refer to similar parts throughout the several views.

The parallel bars B, with perpendicular bar C and pin A, constitute iron-work on cars commonly called "bull-nose," with link O as the connection. I propose to place bolt E in position under upper bar, B, by band S and bolt H, the bolt E having forked ends, the one end being mortised, the lips of mortise having slot open at top, so that hook T can be taken out or dropped in when bolt E is pulled forward, the solid end having lug under for the purpose of pulling it out. The bolt E, in sliding forward, passes through band S and on cross-head of bolt H, the bolt H working in slot in bolt E, the bolt E having groove in under side, into which band S projects, acting as a guide when bolt E is pulled forward. On the side is rest M, projecting beyond outside of bar B, and sliding under bend in saddle G when bolt E is drawn forward, rest M coming under opening I in saddle G and forming rest for pin-holder D, as shown in Fig. 2. The hook T, as shown in Fig. 3, swings from end of bolt E with mortise, the hook T at upper end being made with tenon and bolt in one piece, the tenon of hook T being slipped into mortise of bolt E by holding hook T parallel with bolt E, allowing bolts on tenon of hook T to enter slots in lips of mortise in bolt E, and hook T allowed to swing down to a perpendicular, the lower part of hook T turning at right angles, and turning on a swivel and forming rest for link O when bolt E is drawn forward, hook T supporting link O beyond the center, giving link O an incline on entering opposite bull-nose, the saddle G passing over upper bar, B, as shown in Fig. 2, making square bend on both sides of bar B, the end with opening I making second turn outward, under which rest M passes, and third bend downward, forming side rest for heel of pin-holder D, the pin-holder D passing through opening I in saddle G, with shoulder N resting on rest M on bolt E, the upper part of holder D having two projecting arms for the support of pin A, the arms coming under head of pin A. When cars come together, the bolts E, meeting, slide back to face of bull-nose C, dropping pin-holder D and coupling-pin A through link O. The part of bolt H which holds bolt E in position by cross-head below is square in form; but the part which passes through bar B is round, with thread and nut above.

The holder D or hook T can be changed from one car to another, the bolts F acting as guard to prevent link O from sliding back into bull-nose.

What I claim, and desire to secure by Letters Patent of the United States, is—

The combination of the forked bolt E, holder D, hook T, saddle G, band S, small bolt H, and guard-bolts F, all coacting together as shown and described.

JAMES SHRIGLEY BAYLEY.

Witnesses:
 J. A. DEMPWOLF,
 REINHARDT DEMPWOLF.